No. 829,721. PATENTED AUG. 28, 1906.
G. A. MARSH.
FLOATER.
APPLICATION FILED JAN. 3, 1905.

4 SHEETS—SHEET 1.

Witnesses:

Inventor.

No. 829,721. PATENTED AUG. 28, 1906.
G. A. MARSH.
FLOATER.
APPLICATION FILED JAN. 3, 1905.

4 SHEETS—SHEET 2.

Witnesses:
G. C. Perry
J. J. Staley

Inventor.
Geo. A. Marsh
by Geo. E. Bird
Atty

No. 829,721. PATENTED AUG. 28, 1906.
G. A. MARSH.
FLOATER.
APPLICATION FILED JAN. 3, 1905.
4 SHEETS—SHEET 4.
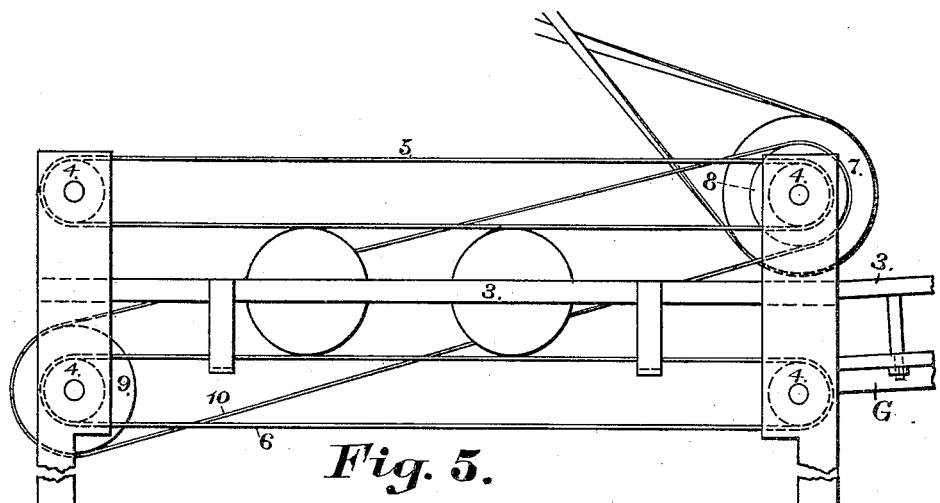
Fig. 5.
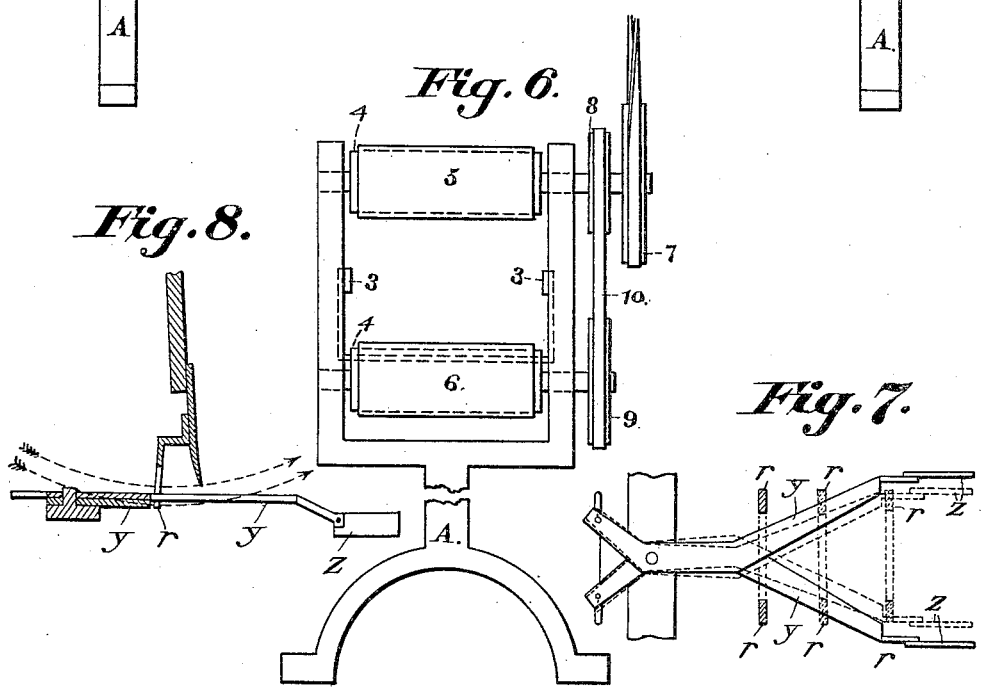
Fig. 6.
Fig. 8.
Fig. 7.
Witnesses: Inventor,

UNITED STATES PATENT OFFICE.

GEORGE A. MARSH, OF DIXFIELD, MAINE, ASSIGNOR OF ONE-HALF TO GEORGE BURNHAM, JR., OF CUMBERLAND, MAINE.

FLOATER.

No. 829,721. Specification of Letters Patent. Patented Aug. 28, 1906.

Application filed January 3, 1905. Serial No. 239,328.

*To all whom it may concern:*

Be it known that I, GEORGE A. MARSH, a citizen of the United States, residing at Dixfield, in the county of Oxford and State of Maine, have invented an Improvement in Floaters; and I hereby declare that the following is a full, clear, and exact description of the invention, which will enable others skilled in the art to which it appertains to make and use the same.

In the manufacture of cans used in hermetically preserving fruits, vegetables, &c., the devices hitherto used for the purpose of soldering the tops and bottoms upon the bodies of the cans have not realized the best results by reason of the large amount of solder employed and the failure to effect a uniform application of the same.

It is the purpose of my invention to provide a device whereby both the top and bottom may be soldered to the body of the can at the same time and by one operation.

My invention consists of opposing soldering-tools provided with an intermediate reservoir wherein the solder may be melted and of various devices which may be used in connection therewith for the purposes of feeding the cans, operating the soldering-tools, feeding the required solder into the reservoir, and removing the soldered cans from the soldering device while they are being cooled.

Figure 1:
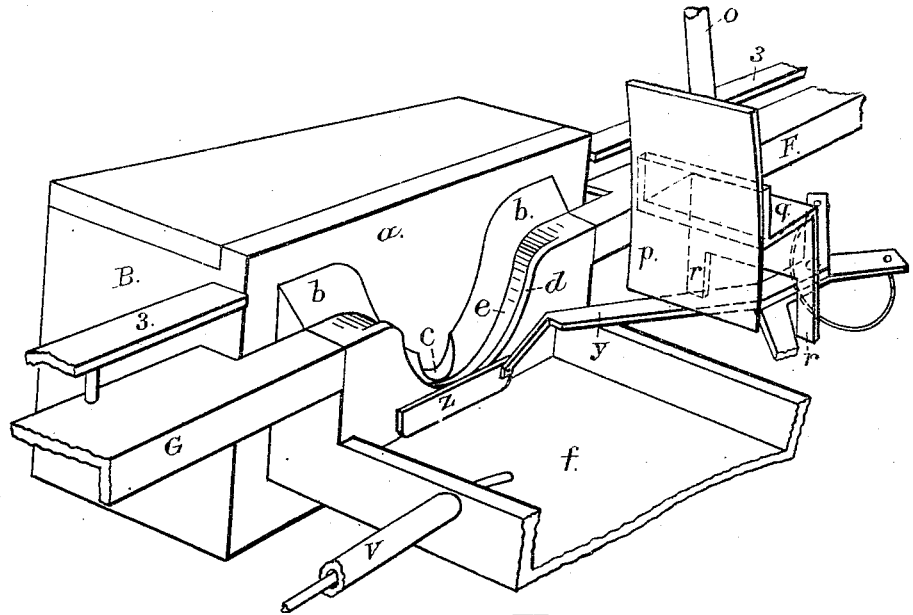
Figure 2:
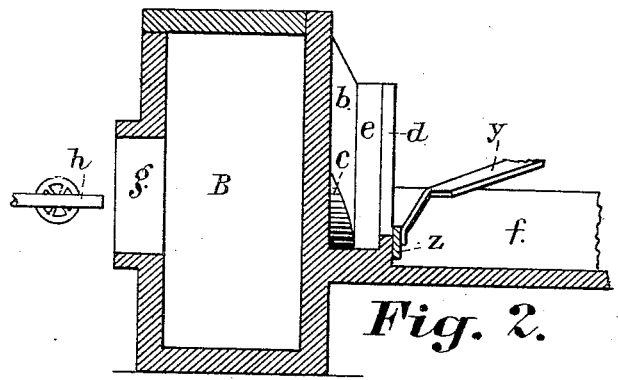
Figure 3:
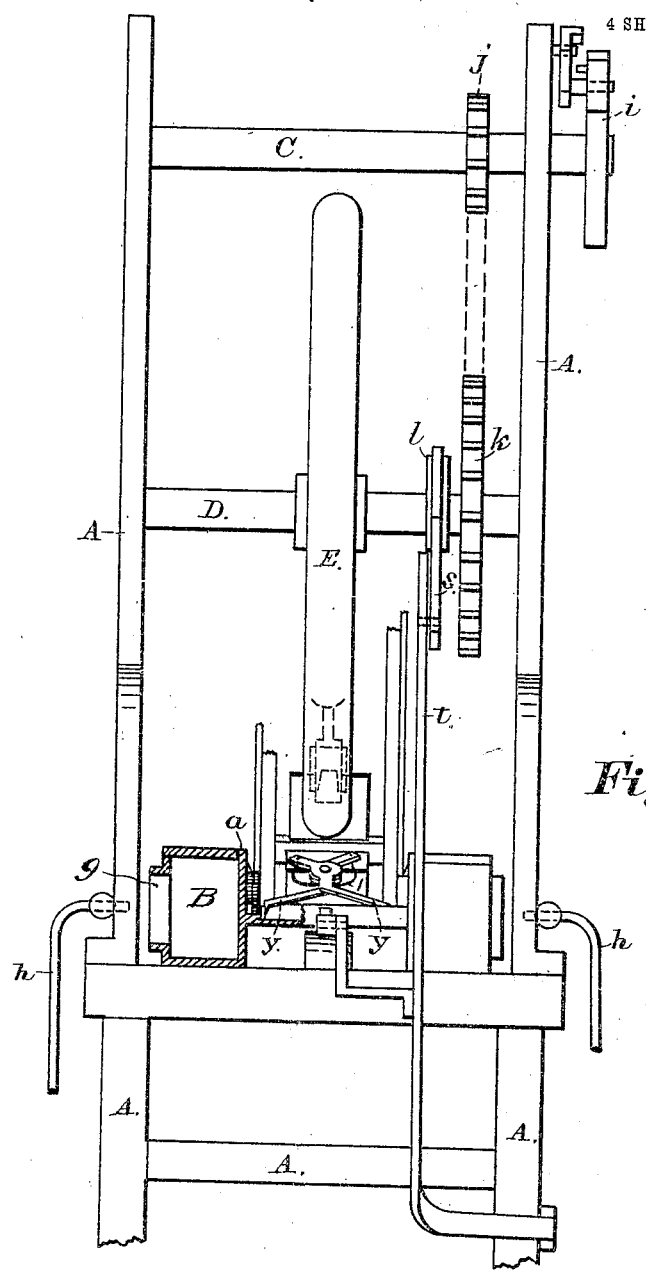
Figure 4:
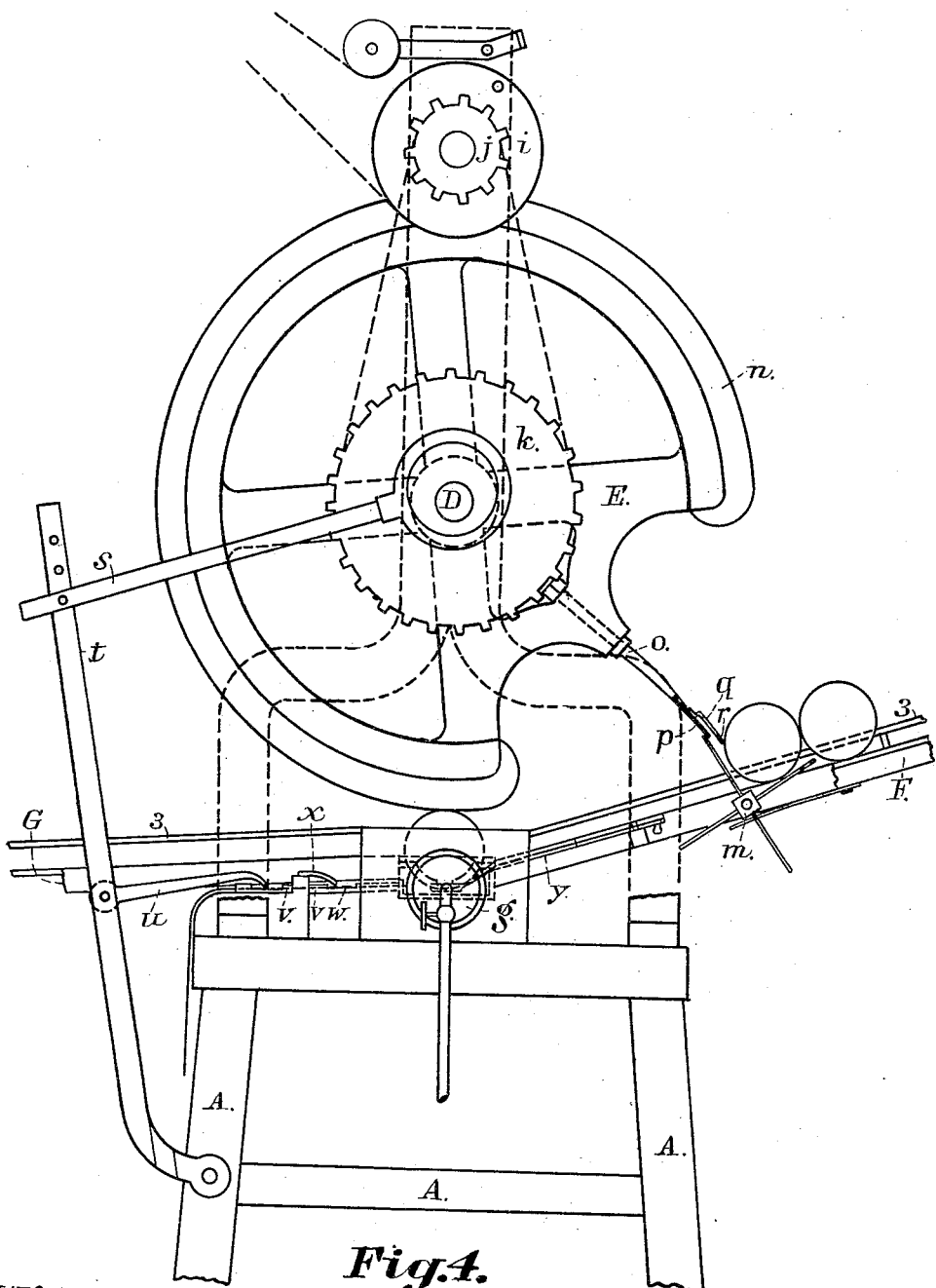

In the drawings, Figure 1 is a perspective view of one of the soldering-tools and a portion of the reservoir. Fig. 2 is a transverse vertical section of the same. Fig. 3 is an end view of the mechanism designed for the operation of the soldering devices. Fig. 4 is a side elevation of the same. Fig. 5 is a side elevation of the mechanism for removing and cooling the soldered cans. Fig. 6 is an end view of the same. Fig. 7 is a detail plan view, partly in section, of the paddle mechanism and means for operating the same; and Fig. 8 is a partial vertical cross-sectional view of the same.

The device whereby the tops and bottoms are soldered upon the bodies of the cans is shown in Figs. 1 and 2. It consists of a plate $a$, upon the face of which are the parts whereby the soldier is applied. These parts consist of a beveled shoulder $b$, (see Figs. 1 and 2) of semicircular form, provided at its lowest point with a semicircular depression $c$, which at its lowest point is of the same width as the widest part of the shoulder. Outside this beveled shoulder and at a distance therefrom slightly less than the flange of the top or bottom to be soldered is an edge $d$ semicircular in form and concentric with the curvature of the shoulder $b$. The space between the edge $d$ and the shoulder $b$ is occupied by a curved surface concentric with the edge $d$ and of slightly larger diameter, so that the surface $e$ is at all points somewhat below the upper surface of the edge $d$. A similar plate is placed opposite the plate just described and the two are connected by a reservoir $f$, the distance between the edges $d\ d$ of the two soldering devices being substantially equal to the distance between the flanges of the top and bottom of the can to be soldered. Preferably the parts just described should be made of steel and may be made in one part or in several parts as convenience may suggest.

This device, as described, may be operated by hand as follows: The plate $a$ and reservoir $f$ may be exposed to heat whereby solder placed in the reservoir $f$ may be kept at the melting-point. The solder in the reservoir when melted should be kept at such a height therein that its surface is slightly below the upper surface of the edge $b$ at its lowest point. As each can is soldered a piece of soldier sufficient to solder the top and bottom of one can should be added to the reservoir, thus keeping the surface of the melted solder constantly at substantially the same height. The solder being thus melted the operator by means of a metallic tool throws sufficient of the solder into the space between the beveled shoulder $b$ and the edge $d$—that is, into the groove $e$—on either side of the reservoir to solder the top and bottom, respectively. Any surplus over and above the desired amount flows into the depression $c$, which prevents the solder from being thrown or spattered upon the upper surface of the top or bottom when the can is placed upon edges $d\ d$. The can-body, the top and bottom having been placed thereon, is now dropped upon the edges $d\ d$ and rotated, the edge $d$ applying sufficient solder to the seams to securely solder the parts together in a few rotations. When the can has thus been rotated, it may be removed and allowed to cool. The operation, however, of this device may be greatly facilitated by the employment of suitable mechanism whereby the various operations of feeding the cans, supplying the needed amount of solder to the reservoir, supplying the groove $e$ with an requisite amount of solder, rotating the cans during the soldering process, and removing the cans when soldered and rotating them while cooling are performed.

I prefer to provide for the heating of the tools or soldering devices by making the plate $a$, to which the soldering devices are attached, part of the fire-box B, (see Fig. 2,) which is a box of rectangular or other shape and is provided in the side opposite that occupied by the tool with an opening $g$, into which the flame of gasolene provided by the pipe $h$ may be forced. While this manner of heating the tools is preferable and probably most convenient, other methods will be readily suggested.

The mechanism designed to automatically perform the soldering process is supported upon a frame A, which is provided near the top with a horizontal shaft C, which carries the pulley $i$ and the gear $j$. Below the shaft C the frame is provided also with a parallel shaft D, which carries the gear $k$, the eccentric $l$, and the wheel E. The gears $j$ and $k$ are connected by an endless chain at a point equidistant from each of the plates $a$ $a$ of the soldering device. The frame of the machine supports tracks or chutes $f$ and $g$ before and behind the soldering device, the vertical plane midway of said tracks being that of the center of the wheel $e$. Preferably the rollway or track F in front of the machine, whereby the cans are fed into the machine, is inclined slightly more than that G in the rear of the machine, which removes the cans therefrom. At the proper point the track F is provided with a turnstile $m$, (see Fig. 4,) provided, preferably, with four wings or arms placed at right angles to each other. The wheel E has a portion, not quite one-fourth of its circumference, removed. (See Fig. 4.) The remaining portion of the circumference is surrounded with an elastic tire or band of india-rubber or similar material $n$, which may be, if desired, protected by a wrapper or winding of rope-yarn. In that portion or segment of the wheel which is removed is placed diametrically and substantially at a point equidistant from the ends of the circumference an arm $o$ of special construction, which is shown in Fig. 4 and also in Fig. 1, the arm terminating in a plate $p$, (see Fig. 1,) to which (see Figs. 1 and 4) is attached a bent plate $q$, which terminates in the fingers $r$ $r$. The eccentric $i$ carries the arm $s$, which is adjustably pivoted to the rod $t$, the lower end of which is pivoted to the frame of the machine. At about midway of the length of the rod there is pivoted thereto the finger $u$, which extends inwardly toward the center of the reservoir $f$ and is provided at the inner end with a bifurcation of suitable size to engage a wire of solder. Somewhat still farther toward the reservoir is provided a pipe $v$, which at $w$ is slotted to admit the sharp edge of the dog $x$, as shown in Fig. 4. Upon the opposite side of the reservoir are pivoted two arms $y$ $y$, which cross each other scissorswise and each of which terminates in a steel paddle $z$. (See Figs. 1, 2, and 3.) A spring 1 normally holds the paddles $z$ $z$ apart, as shown in Fig. 3, while the pivot of these arms is so placed as to hold the paddles $z$ $z$ slightly above the bottom of the reservoir, the normal position being shown in Fig. 2. The paddles are so arranged and constructed that their lower edges are substantially parallel with the bottom of the reservoir, while the arms extend from the paddles toward the point where they are pivoted gradually upward and of course inwardly. (See Fig. 3.) The pivot and the center of the periphery of the wheel E are in substantially the same vertical plane.

That portion of the device which provides for the removal of the soldered can from the machine is shown in Figs. 5 and 6. It consists of an appropriate frame A, provided with guides 3 3 on either side sufficiently far apart to allow the passage of the can between them (see Fig. 5) and which is provided at the top and also near the bottom and at either end with rollers 4 4, which are of substantially the same diameter. The upper set of rollers is provided with an endless belt 5, while the lower set of rollers is provided with an endless belt 6. Power is applied by means of the pulley 7 at one end of one of the upper rollers. At the end of this roller and at the like end of the lower roller diagonally opposite thereto are fixed the pulleys 8 and 9, respectively, that upon the upper roller being somewhat smaller in diameter than that upon the lower roller. These pulleys 8 and 9 are connected by means of the belt 10.

In operation the tools and reservoir are subjected to the necessary degree of heat by admitting the flame of burning gasolene and under pressure into the fire-boxes, as provided in the illustrations or by such other means as may be preferred. Solder is then placed in the reservoir in such quantity that when melted its upper surface will be slightly beneath the lowest point in the edge $d$. Solder-wire of the requisite diameter is carried from a spool, whereon it is wound beneath the bifurcation of the finger $u$ through the pipe $v$ beneath the sharpened edge of the dog $x$ into the slot $w$ to the edge of the reservoir. The supply of cans is now placed on the track F between the guards or guides 3 3, the lower can resting against one of the arms of the turnstile *m*, (see Fig. 4,) the flanges of the top and bottom having been provided with the requisite amount of acid as they are placed upon the body of the can. Power is now applied, and as the wheel E rotates the plate *p* engages the turnstile, causing it to make a quarter-revolution and allowing the first can to roll toward the reservoir while the next arm of the turnstile holds the next succeeding can. As the arm descends the bifurcated fingers *r r* encounter the arms *y y*, thus partially closing them and again suddenly releasing them, whereby the paddles *z z* cast or throw from the surface of the melted solder into the groove *e* the amount of solder necessary for the soldering of the top and bottom of the approaching can. By the time that the periphery of the wheel E has reached a position over the reservoir the can has already rolled upon the edges *d d* of the soldering-tool and rests upon the elevated upper surface of the paddles *z z*. As the periphery of the wheel E engages the top of the can the paddles *z z* are depressed, so that the seam to be soldered rests against the edges *d d*. Continuous rotation of the wheel E rotates the can, exposing the seams to the solder in the grooves *e*, whereby it is applied to the seams. When the periphery of the wheel E passes off and out of contact with the body of the can, the can is elevated from the edges *d d* by the paddles *z z*, (actuated by the spring of the arms *y y*,) from which position it is removed by the plate *p*, as it again descends, onto the rollway or track G, whence it rolls to the device shown in Fig. 5 onto the surface of the band 6, by the action of which and the band 5 the can is rotated and rolled into the proper receptacle, thus preventing the solder while partially molten from accumulating at any particular point before cooling. During the operation above described the requisite amount of solder for soldering a can is fed into the reservoir, wherein it is melted before the next can reaches the soldering-tools.

The paddles *z z* should be constructed of fine steel, enabling the same to tin readily, as when thus tinned they remove as they raise the can after the soldering operation all surplus molten solder. The arms *y y* are preferably of fine steel also, giving them thus the requisite spring to permit the depression of the paddles by the can and their elevation with the can when the latter passes from under the tire of the wheel E.

What I claim is—

1. The combination of two similar soldering-tools placed in opposition to each other, each tool being provided with a beveled semicircular shoulder, said shoulder having a depression in the lowest part thereof adapted to receive and hold any surplus of the solder applied to the tool, a semicircular soldering edge and a groove or channel between said shoulder and edge, substantially as described.

2. The combination of two opposing similar soldering-tools, a reservoir between them, two levers crossing and pivoted, each provided at one end with a paddle and at the other with a spring, normally separating them, and means whereby they may be automatically and regularly partially closed and then released, substantially as described.

3. In combination with a device for applying solder or like substances to the periphery of circular or cylindrical bodies, a wheel having a portion of its circumference removed and a device affixed thereto within said portion removed adapted to operate mechanism by which the cans are delivered to said device, the remainder of said circumference being provided with a flexible tire, and means for rotating said wheel, substantially as described.

4. In combination with a device for applying solder or like substances to the periphery of cylindrical bodies a wheel having a portion of its circumference removed, a device affixed to said wheel within the portion of the circumference so removed whereby the means for supplying said device with solder may be operated, means for so supplying said solder and means for rotating said wheel, substantially as described.

5. In combination with a device for applying solder or like substance to the periphery of circular or cylindrical bodies, a wheel, a rollway inclining thereto, a turnstile controlling said rollway, and a revolving arm adapted to trip said turnstile, substantially as described.

6. The combination of two opposing soldering-tools with a reservoir between, two levers crossed and pivoted and provided at one end with paddles adapted to play within said reservoir, and at the other end with a spring distending said levers and a revolving bifurcated arm whereby said levers may be alternately partially closed and released, substantially as described.

7. In combination with each of two opposing semicircular soldering-tools, an arm lying against the face of each tool normally held by a spring above the lowest portion of the surface of said tools, substantially as described.

8. In combination with each of two opposing soldering-tools, an arm adapted to lie against the face of each tool during the soldering process, said arm being normally held slightly above the lowest portion of the soldering-surface of said tool and capable of depression by force and of returning to its normal position when released, substantially as described.

9. In combination with a device adapted to apply solder or similar substance to the periphery of a cylindrical body, a revolving segmental wheel whereby such body is revolved during the soldering process and a device attached to said wheel whereby means for feeding a succession of the bodies to be operated upon may be actuated, substantially as described.

In testimony that I claim the foregoing as my invention I have hereunto set my hand this 27th day of December, A. D. 1904.

GEORGE A. MARSH.

In presence of—
 GEO. E. BIRD,
 A. C. BERRY.